US009628157B2

(12) United States Patent
Maes et al.

(10) Patent No.: US 9,628,157 B2
(45) Date of Patent: Apr. 18, 2017

(54) NON-LINEAR PRECODER WITH SEPARATE MODULO DECISION

(71) Applicant: Alcatel Lucent, Boulogne-Billancourt (FR)

(72) Inventors: Jochen Maes, Laakdal (BE); Michael Timmers, Herent (BE)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

(21) Appl. No.: 14/782,730

(22) PCT Filed: Apr. 28, 2014

(86) PCT No.: PCT/EP2014/058532
§ 371 (c)(1),
(2) Date: Oct. 6, 2015

(87) PCT Pub. No.: WO2014/177481
PCT Pub. Date: Nov. 6, 2014

(65) Prior Publication Data
US 2016/0043786 A1    Feb. 11, 2016

(30) Foreign Application Priority Data

Apr. 30, 2013  (EP) .................... 13305569

(51) Int. Cl.
*H04L 27/28*   (2006.01)
*H04B 7/0456*  (2017.01)
(Continued)

(52) U.S. Cl.
CPC ............ *H04B 7/0456* (2013.01); *H04B 3/32* (2013.01); *H04L 25/03159* (2013.01); *H04L 25/03343* (2013.01); *H04L 2025/03636* (2013.01)

(58) Field of Classification Search
CPC ... H04B 7/0456; H04B 3/32; H04L 25/03343; H04L 25/03159; H04L 2025/03636
(Continued)

(56) References Cited

U.S. PATENT DOCUMENTS 8,130,854 B2 * 3/2012 Fischer ................ H04L 1/0618
                                                    341/50
2006/0198459 A1   9/2006 Fischer et al.
2006/0274825 A1 * 12/2006 Cioffi ................ H04L 25/03343
                                                    375/222

FOREIGN PATENT DOCUMENTS

CN     101213805 A    7/2008
CN     101610229 A    12/2009

OTHER PUBLICATIONS

International Search Report PCT/ISA/210 for International Application No. PCT/EP2014/058532 dated Jul. 17, 2014.
(Continued)

*Primary Examiner* — Daniel Washburn
*Assistant Examiner* — Fitwi Hailegiorgis
(74) *Attorney, Agent, or Firm* — Harness, Dickey & Pierce, P.L.C.

(57) ABSTRACT

The present invention relates to a signal processing unit for pre-processing signals for crosstalk mitigation.
In accordance with an embodiment of the invention, the signal processing unit comprises a modulo unit configured to determine individual modulo shifts (Δ) for respective transmit samples (U) to be transmitted over respective communication channels (H) based on first channel coupling information (L), and to add the modulo shifts to the respective transmit samples, and a linear precoder configured to jointly process the resulting transmit samples based on second channel coupling information (p') that aim at effectively diagonalizing an overall channel matrix (HP') resulting from the concatenation of the linear precoder with the communication channels.
(Continued)

The present invention also relates to a method for pre-processing signals for crosstalk mitigation.

13 Claims, 5 Drawing Sheets

(51) Int. Cl.
　　*H04B 3/32* (2006.01)
　　*H04L 25/03* (2006.01)
(58) Field of Classification Search
　　USPC .................................. 375/260, 222; 341/50
　　See application file for complete search history.

(56) References Cited

OTHER PUBLICATIONS

Written Opinion of the International Searching Authority PCT/ISA/237 for International Application No. PCT/EP2014/058532 dated Jul. 17, 2014.

* cited by examiner

Fig. 1

Prior Art

NON-LINEAR PRECODER WITH SEPARATE MODULO DECISION

CROSS-REFERENCE TO RELATED APPLICATIONS

This application is a national phase under 35 U.S.C. §371 of PCT International Application No. PCT/EP2014/058532 which has an International filing date of Apr. 28, 2014, the entire contents of each of which are hereby incorporated herein by reference.

TECHNICAL FIELD OF THE INVENTION

The present invention relates to crosstalk mitigation within a wired communication system.

TECHNICAL BACKGROUND OF THE INVENTION

Crosstalk (or inter-channel interference) is a major source of channel impairment for Multiple Input Multiple Output (MIMO) wired communication systems, such as Digital Subscriber Line (DSL) communication systems.

As the demand for higher data rates increases, DSL systems are evolving toward higher frequency bands, wherein crosstalk between neighboring transmission lines (that is to say transmission lines that are in close vicinity over part or whole of their length, such as twisted copper pairs in a cable binder) is more pronounced (the higher frequency, the more coupling).

A MIMO system can be described by the following linear model:

$$Y(k)=H(k)X(k)+Z(k) \quad (1),$$

wherein the N-component complex vector X, respectively Y, denotes a discrete frequency representation, as a function of the frequency/carrier/tone index k, of the symbols transmitted over, respectively received from, the N channels, wherein the NxN complex matrix H is referred to as the channel matrix: the (i,j)-th component $h_{ij}$ of the channel matrix H describes how the communication system produces a signal on the i-th channel output in response to a signal being transmitted to the j-th channel input; the diagonal elements of the channel matrix describe direct channel coupling, and the off-diagonal elements of the channel matrix (also referred to as the crosstalk coefficients) describe inter-channel coupling, and wherein the N-component complex vector Z denotes additive noise over the N channels, such as Radio Frequency Interference (RFI) or thermal noise.

Different strategies have been developed to mitigate crosstalk and to maximize effective throughput, reach and line stability. These techniques are gradually evolving from static or dynamic spectral management techniques to multi-user signal coordination (or vectoring).

One technique for reducing inter-channel interference is joint signal precoding: the transmit data symbols are jointly passed through a precoder before being transmitted over the respective communication channels. The precoder is such that the concatenation of the precoder and the communication channels results in little or no inter-channel interference at the receivers.

A further technique for reducing inter-channel interference is joint signal post-processing: the receive data symbols are jointly passed through a postcoder before being detected. The postcoder is such that the concatenation of the communication channels and the postcoder results in little or no inter-channel interference at the receivers.

The choice of the vectoring group, that is to say the set of communication lines, the signals of which are jointly processed, is rather critical for achieving good crosstalk mitigation performances. Within a vectoring group, each communication line is considered as a disturber line inducing crosstalk into the other communication lines of the group, and the same communication line is considered as a victim line receiving crosstalk from the other communication lines of the group. Crosstalk from lines that do not belong to the vectoring group is treated as alien noise and is not canceled.

Ideally, the vectoring group should match the whole set of communication lines that physically and noticeably interact with each other. Yet, local loop unbundling on account of national regulation policies and/or limited vectoring capabilities may prevent such an exhaustive approach, in which case the vectoring group would include a sub-set only of all the physically interacting lines, thereby yielding limited vectoring gains.

Signal vectoring is typically performed within a Distribution Point Unit (DPU), wherein all the data symbols concurrently transmitted over, or received from, all the subscriber lines of the vectoring group are available. For instance, signal vectoring is advantageously performed within a Digital Subscriber Line Access Multiplexer (DSLAM) deployed at a Central Office (CO) or as a fiber-fed remote unit closer to subscriber premises (street cabinet, pole cabinet, etc). Signal precoding is particularly appropriate for downstream communication (toward customer premises), while signal post-processing is particularly appropriate for upstream communication (from customer premises).

Linear signal precoding is advantageously implemented by means of matrix products: a linear precoder performs a matrix-product in the frequency domain of a transmit vector U(k) with a precoding matrix P(k), the precoding matrix P(k) being such that the overall channel matrix H(k)P(k) is diagonalized, meaning the off-diagonal coefficients of the overall channel H(k)P(k), and thus the inter-channel interference, mostly reduce to zero.

Practically, and as a first order approximation, the precoder superimposes anti-phase crosstalk pre-compensation signals over the victim line along with the direct signal that destructively interfere at the receiver with the actual crosstalk signals from the respective disturber lines.

More formally, let us write the channel matrix H as:

$$H=D \cdot (I+G) \quad (2),$$

wherein the carrier index k has been voluntarily omitted, D is a diagonal matrix comprising the direct channel coefficients $h_{ii}$, I is the identity matrix, and G is an off-diagonal crosstalk channel matrix comprising the normalized crosstalk coefficients $h_{ij}/h_{ii}$.

Ideal Zero-Forcing (ZF) linear precoding is achieved when the precoding matrix P implements the inverse of the normalized crosstalk coupling channel, namely:

$$P=(I+G)^{-1} \quad (3),$$

such that H·P=D, the latter being compensated by single-tap Frequency EQualization (FEQ) at the receiver. With linear ZF precoding, the noise at the receiver input is enhanced by the direct channel frequency response by a factor $1/h_{i,i}$. We also note that the noise is evenly enhanced for identical lines as they are all expected to have an equal path loss $h_{i,i}$.

With the advent of new copper access technologies and the use of even broader spectrum up to and beyond 100 MHz, the crosstalk power increases and may exceed the direct signal power, yielding a negative Signal to Noise Ratio (SNR). The superimposition of the crosstalk precompensation signals on the victim line may thus cause a violation of the transmit Power Spectral Density (PSD) mask, which defines the allowed amount of signal power for an individual user as a function of frequency, and may as well result in signal clipping within the Digital to Analog Converter (DAC) chipset causing severe signal distortions.

A prior art solution is to scale down the direct signal gains such that the transmit signals, including both the direct and precompensation signals, remain within the allowed limit. The PSD reduction is line and frequency dependent, and may change over time, e.g. when a line joins or leaves the vectoring group. The change in direct signal gains must be communicated to the receiver to avoid FEQ issues. This first solution has been described in a standard contribution to the International Telecommunication Union (ITU) from Alcatel-Lucent entitled "G.fast: Precoder Gain Scaling", reference ITU-T SG15 Q4a 2013-03-Q4-053, March 2013.

Another prior art solution is the use of Non-Linear Precoding (NLP), which applies modulo arithmetic operation to shift a transmit constellation point with excessive power back within the constellation boundary. At the receiver, the same modulo operation will shift the signal back to its intended position.

The idea to employ modulo arithmetic to bound the value of the transmit signal was first introduced by Tomlinson and Harashima independently and nearly simultaneously with application to single-user equalization (M. Tomlinson, "New Automatic Equalizer Employing Modulo Arithmetic" Electronics Letters, 7(5-6), pp. 138-139, March 1971; and H. Harashima, and H. Miyakawa, "Matched-Transmission Technique for Channels with Inter Symbol Interference" IEEE Trans. on Communications, 20(4), pp. 774-780, August 1972). Ginis and Cioffi applied the concept to multi-user system with precoding for crosstalk cancellation (G. Ginis and J. M. Cioffi, "A Multi-User Precoding Scheme Achieving Crosstalk Cancellation with Application to DSL systems", Proc. 34th Asilomar Conference on Signals, Systems and Computers, 2000).

Yet, modulo operation directly affects the transmit signal and thus the actual crosstalk induced onto the system, ending into a 'chicken-egg' problem: modulo operation for a first user alters precompensation for a second user; altered precompensation for the second user alters modulo operation for the second user; altered modulo operation for the second user user alters precompensation for the first user; and altered precompensation for the first user alters modulo operation for the first user; and so on.

In order to overcome this issue, the non-linear precoder is constructed using QR matrix decomposition. A good overview of the technique, with step-by-step description of the functions is given by Ikanos (S. Singh, M. Sorbara, "G.fast: Comparison of Linear and Non-Linear Pre-coding for G.fast on 100m BT Cable", ITU-T SG15 Q4a contribution 2013-01-Q4-031, January 2013).

The conjugate transpose of the normalized channel matrix is first factored into two matrices, namely:

$$(I+G)^* = QR \qquad (4),$$

wherein * denotes the conjugate transpose, R is an N×N upper triangular matrix, Q is a N×N unitary matrix that preserves power (i.e., $Q^*Q=I$), and N denotes the number of subscriber lines in the vectoring group.

One diagonalizing precoding matrix is then given by:

$$P = QR^{*-1} \qquad (5)$$

yielding $HP = D(I+G)QR^{*-1} = DR^*Q^*QR^{*-1} = D$.

Let us write:

$$R^{*-1} = LS^{-1} \qquad (6),$$

wherein L is a N×N lower triangular matrix with unit diagonal, and S is a N×N normalization diagonal matrix whose elements are the diagonal elements of $R^*$.

The diagonal matrix S indicates a per-line precoding gain that depends on the encoding order. S scaling is to be disposed of as modulo operation has to operate on normalized frequency samples, thereby yielding $P=QL$ and $HP=D$ $(I+G)QL=DR^*Q^*QR^{*-1}S=DS$. A further equalization step $S^{-1}$ is thus required at the receiver to recover the initial transmit sample.

The non-linear precoder comprises a first feedforward filter L, or equivalently a first feedback filter $I-S^{-1}R^*$, followed by a second feedforward filter Q.

In a first step, the transmit vector U is multiplied row by row with the lower triangular matrix L, but before proceeding to the next row, the output for element i is adapted through a modulo operation, thereby keeping the transmit power within the allowed bounds. The triangular structure of the matrix L is a solution to the aforementioned 'chicken-egg' problem: the modulo output for user i serves as input for users j encoded later (j>i), but does not affect the output of users k encoded earlier (k<i).

In a second step, the resulting vector is multiplied with the matrix Q, which preserves the initial transmit power on account of its unitary property.

More formally, the output of the non-linear precoder x' is given by:

$$\begin{aligned} x'_1 &= u_1 \\ x'_2 &= \Gamma_{2,k}\left(u_2 - \frac{r_{21}}{r_{22}}x'_1\right) \\ &\vdots \\ x'_N &= \Gamma_{N,k}\left(u_N - \frac{r_{NN-1}}{r_{NN}}x'_{N-1} - \ldots - \frac{r_{N1}}{r_{NN}}x'_1\right), \end{aligned} \qquad (7)$$

wherein $r_{ij}$ denotes the coefficients of $R^*$, and $\Gamma_{i,k}$ denotes the modulo operator as a function of the constellation size for carrier k and user i.

The modulo operator $\Gamma_{i,k}$ is given by:

$$\Gamma_{i,k}(x_{i,k}) = x_{i,k} - d \cdot M_{i,k} \cdot \left\lfloor \frac{x_{i,k} + d \cdot M_{i,k}/2}{d \cdot M_{i,k}} \right\rfloor, \qquad (8)$$

wherein $x_{i,k}$ denotes a transmit frequency sample for carrier k and user i, $M_{i,k}$ denotes the number of constellation points per I/Q dimension for carrier k and user i, and d denotes the distance between neighboring constellation points in the one dimension.

The complexity of vectoring N lines through NLP is $b^2(N^2+N(N+1)/2)=b^2(3N^2/2+N/2)$ multiply-accumulate operations, wherein b denotes the number of bits used in computer arithmetic, and excluding the modulo operation that may count as one or two complex multiply-accumulate operations per line.

At the receiver, the equalized receive signal samples are given by:

$$y'_i = r_{ii}\Gamma_{i,k}\left(u_i - \sum_{j=1}^{i-1} \frac{r_{ij}}{r_{ii}} x'_j\right) + \sum_{j=1}^{i-1} r_{ij} x'_j + z_i. \quad (9)$$

A further equalization step $S^{-1}$ together with a further modulo operation is then needed to recover the initial transmit vector U:

$$\hat{y}_i = \Gamma_{i,k}\left(\frac{y'_i}{r_{ii}}\right) = \quad (10)$$

$$\Gamma_{i,k}\left(\Gamma_{i,k}\left(u_i - \sum_{j=1}^{i-1} \frac{r_{ij}}{r_{ii}} x'_j\right) + \sum_{j=1}^{i-1} \frac{r_{ij}}{r_{ii}} x'_j + \frac{z_i}{r_{ii}}\right) = \Gamma_{i,k}\left(u_i + \frac{z_i}{r_{ii}}\right).$$

The term $$u_i + \frac{z_i}{r_{ii}}$$

is expected to be within the constellation boundaries and thus $$\Gamma_{i,k}\left(u_i + \frac{z_i}{r_{ii}}\right)$$

should be equal to $$u_i + \frac{z_i}{r_{ii}}.$$

The decision $\hat{u}_i$ is then made on that sample.

Figure 1:
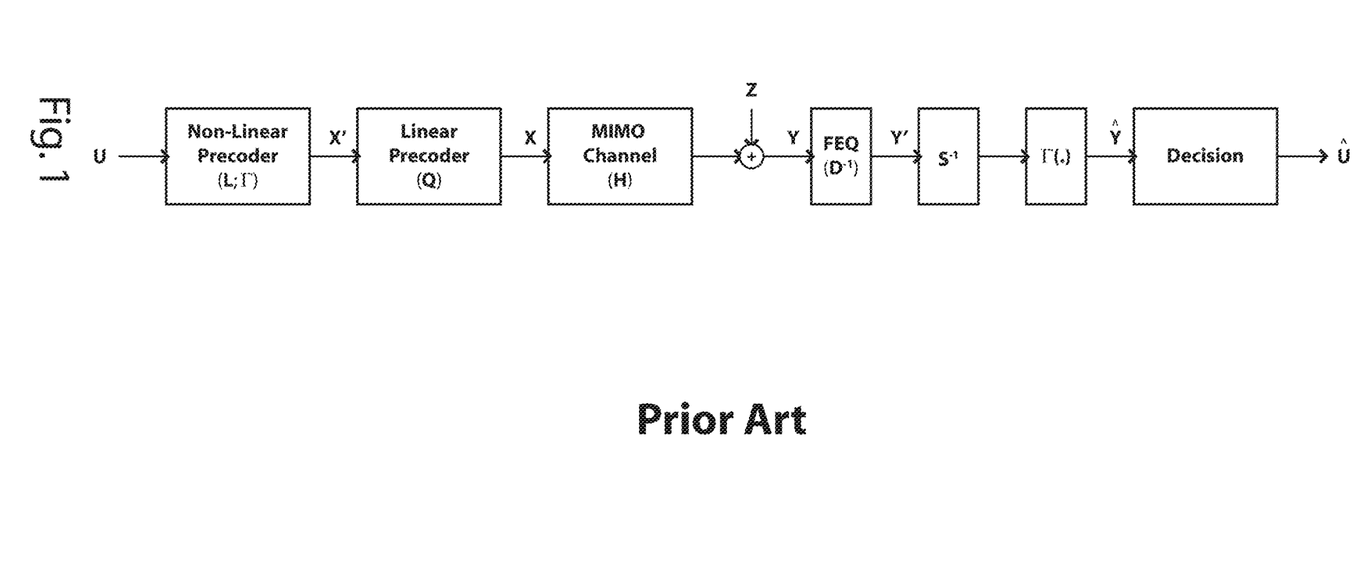
FIG. 1 represents a reference model for the prior art non-linear precoder, which has been already discussed.

The corresponding reference model has been depicted in FIG. 1.

We note that the non-linear precoder implemented with QR matrix decomposition achieves ZF equalization, while the noise sample at the receiver input is enhanced by a factor of $1/r_{ii}$. We also note that for a cable with identical lines, the diagonal values of the R* matrix do not have the same value; hence the noise enhancement is not the same on each line, which may lead to an unfair distribution of bit rates to the different users depending on the level of crosstalk couplings.

Several issues arise due to the step-wise approach of going first through a feedback filter followed by a feedforward filter.

A first issue is the amount of processing resources required for updating the non-linear precoder. If P needs to be updated (e.g., for tracking the crosstalk channel variation), then Q and L need to be updated as well. There is no known solution for updating Q and L independently simultaneously. Hence each tracking step comprises a new decomposition of the updated P or H matrix.

Another issue is the added quantization noise on account of the extra multiplication stage. As compared to linear precoding with one single matrix multiplication, the quantization noise is doubled due to two successive multiplications with two matrices L and Q respectively.

Still another issue is related to discontinuous transmission mode, wherein one or more subscriber lines are put into some passive state without any signal being transmitted, thereby saving some substantial power. This involves running through several sub-blocks of Q and L multiple times, increasing the run-time complexity by a factor of nearly 2.

SUMMARY OF THE INVENTION

It is an object of the present invention to alleviate or overcome the aforementioned shortcomings or drawbacks of the prior art solutions.

In accordance with a first aspect of the invention, an access node comprises a signal processor for pre-processing signals for crosstalk mitigation and a controller for controlling the operation of the signal processor. The signal processor comprises a modulo unit configured to determine individual modulo shifts for respective transmit samples to be transmitted over respective communication channels based on first channel coupling information, and to add the modulo shifts to the respective unprecoded transmit samples. The signal processor further comprises a linear precoder configured to jointly process the resulting transmit samples based on second channel coupling information. The controller is configured to jointly process the resulting transmit samples based on second channel coupling information. The controller is configured to update the first channel coupling information and the second channel coupling information independently from each other.

In accordance with another aspect of the invention, a method for pre-processing signals for crosstalk mitigation comprises determining individual modulo shifts for respective transmit samples to be transmitted over respective communication channels based on first channel coupling information, adding the modulo shifts to the respective unprecoded transmit samples, and jointly processing the resulting transmit samples through linear precoding based on second channel coupling information. The method further comprises updating the first channel coupling information and the second channel coupling information independently from each other.

In one embodiment of the invention, modulo operation use lower precision arithmetic than linear precoding. In one embodiment of the invention, the precision arithmetic for modulo operation is a function of the number of active communication channels among the communication channels.

In one embodiment of the invention, the first channel coupling information are updated upon a change of the set of active communication channels among the communication channels, while the second channel coupling information are left unchanged.

In one embodiment of the invention, the resulting transmit samples are jointly processed through the linear precoder by means of a single matrix multiplication stage.

The access node (or access multiplexer) that supports wired communication to subscriber devices over an access plant, and may for instance refer to a DSLAM, an Ethernet switch, an edge router, etc. The access node is deployed at a CO or as a fiber-fed remote unite closer to subscriber premises (street cabinet, pole cabinet, etc).

The present invention proposes to first determine an amount of modulo shift $\delta_i$ to be applied to the individual transmit samples $u_i$ based on the coupling matrix L (feedforward filter), or equivalently on the coupling matrix $I-S^{-1}R^*$ (feedback filter).

However, there is no need to compute the intermediary transmit vector X'. Instead, the vector U+Δ, wherein Δ denotes the corresponding shift vector, is directly fed to the linear precoder with precoding matrix P'=PS=QL (implemented as a single matrix multiplication stage), that is to say a precoding matrix P' whose object is to effectively diagonalize the overall channel matrix HP'=HQL=DS resulting from the concatenation of the linear precoder with precoding matrix P' and the communication channels with channel matrix H. In this way, the modulo decision can be made separately from the actual precoding, and the multiplication with L is removed from the data path.

Figure 2:
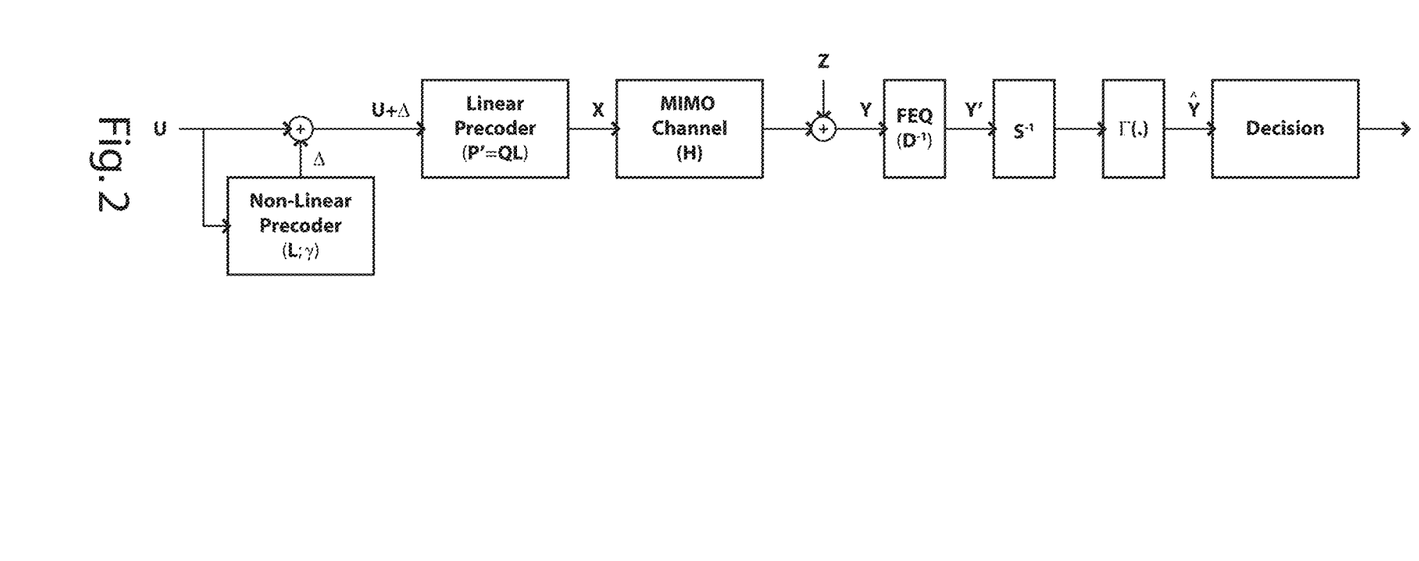
FIG. 2 represents a reference model for a non-linear precoder as per the present invention, which has been discussed too.

The corresponding reference model has been depicted in FIG. 2.

The following benefits arise:

P' and L can be tracked independently. For instance, when the precoder matrix is updated, then the modulo decision process does not necessarily need to be modified too, thereby avoiding a QR matrix decomposition at every update step.

Since P' can be tracked independently from L, many of the known update mechanism, developed for linear precoding can be applied. There is no need to track Q and L synchronously, or worry how one can be tracked while the other remains constant.

Since the transmit vector U needs to go through only one matrix P', there is no amplification of quantization noise as opposed to multiplication with L and next Q. Indeed, any quantization noise through feedback filtering is removed, since X' is thrown away and only Δ is stored with Δ being on a predefined grid.

As long as P' is accurate, precoding will effectively cancel the crosstalk even if L is not fully accurate. A less accurate L may only cause transmit power increase and possibly some transient PSD violations.

Since the multiplication of L is not in the data path but only serves in generating the shift vector Δ where the elements in Δ are on a coarse grid, the precision $b_L$ for multiplication with L can be greatly reduced: $b_L$<b. The complexity now becomes is $b^2K^2 + b_L^2 K(K+1)/2$ multiply-accumulate operations (excluding the modulo operation), and thus requires less processing resources as traditional non-linear precoding.

The discontinuous transmission mode is facilitated: there is no need to change the encoding order to match the deactivation order, hence no need to write new precoder coefficients or to send new precoding gains to the receivers. Also, there is no increased run-time complexity for allowing discontinuous transmission mode.

BRIEF DESCRIPTION OF THE DRAWINGS

The above and other objects and features of the invention will become more apparent and the invention itself will be best understood by referring to the following description of an embodiment taken in conjunction with the accompanying drawings wherein.

DETAILED DESCRIPTION OF THE INVENTION

Figure 3:
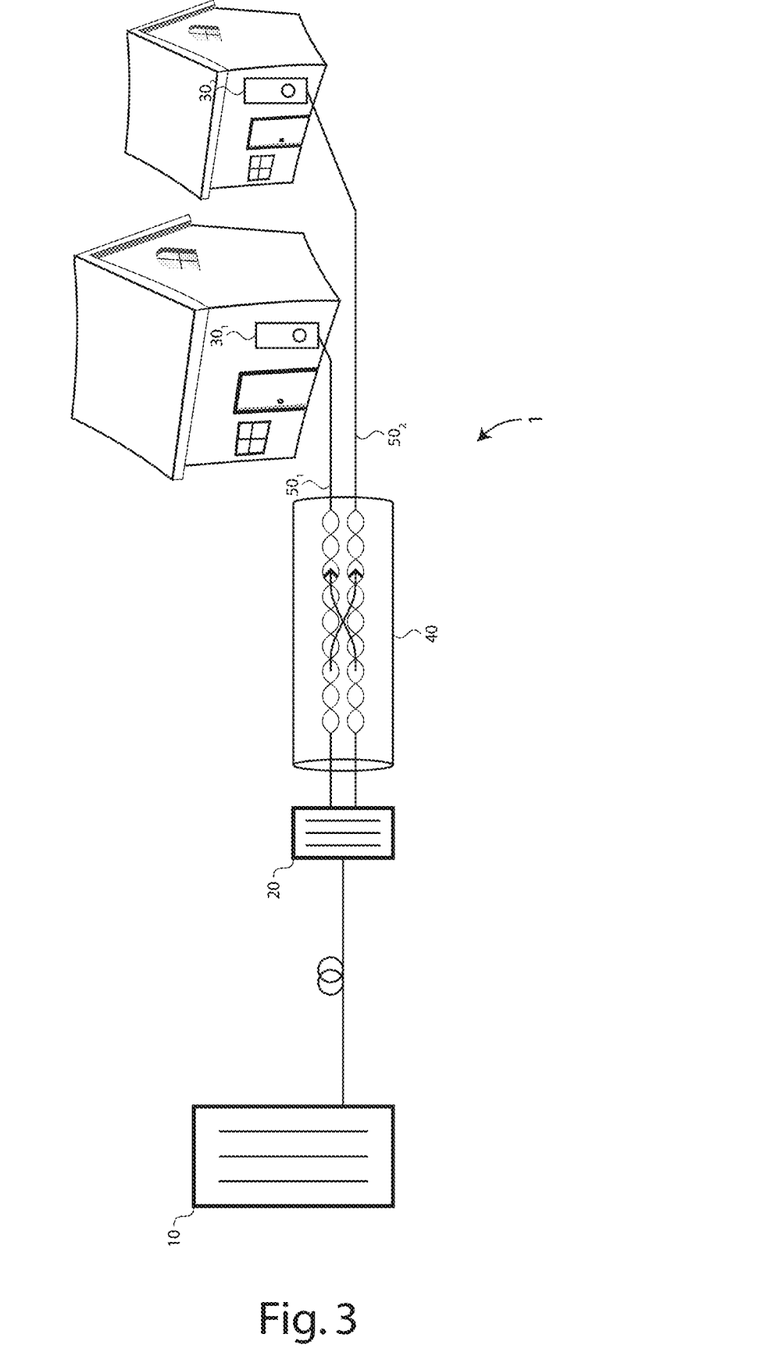
FIG. 3 represents an overview of an access plant.

There is seen in FIG. 3 an access plant 1 comprising a network unit 10 at a CO, a DPU 20 coupled via one or more optical fibers to the network unit 10, and further coupled via a copper loop plant to Customer Premises Equipment (CPE) 30 at various subscriber premises.

The copper loop plant comprises a common access segment 40, wherein the subscriber lines are in close vicinity with each other and thus induce crosstalk into each other, and dedicated loop segments 50 for final connection to the subscriber premises. The transmission media is typically composed of copper Unshielded Twisted Pairs (UTP).

The DPU 20 comprises a vectoring processing unit for jointly processing the data symbols that are being transmitted over, or received from, the loop plant in order to mitigate the crosstalk induced within the common access segment and to increase the communication data rates achievable over the respective subscriber lines.

Figure 4:
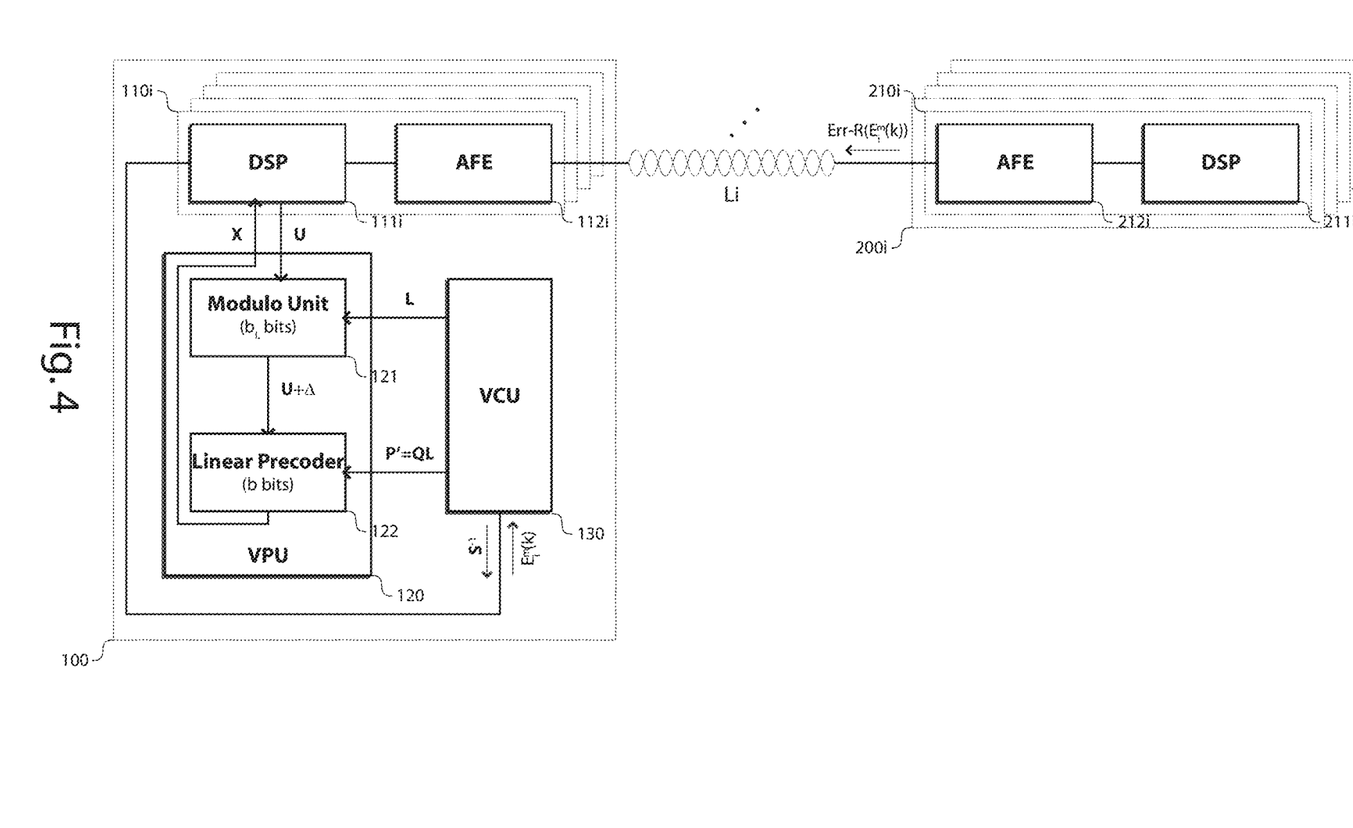
FIG. 4 represents further details about an access node as per the present invention.

There is seen in FIG. 4 further details about a DPU 100 as per the present invention. The DPU 100 is coupled to CPES 200$i$ through respective transmission lines Li, which are assumed to form part of the same vectoring group.

The DPU 100 comprises:

DSL transceivers 110$i$;

a Vectoring Processing Unit (VPU) 120; and a vectoring Control Unit (VCU) 130 for controlling the operation of the VPU 120.

The DPU 100 may also comprises a postcoder for canceling the crosstalk from upstream receive signals. The corresponding blocks have been purposely omitted in FIG. 3 as they are irrelevant for the present invention.

The DSL transceivers 110$i$ are individually coupled to the VPU 120 and to the VCU 130. The VCU 130 is further coupled to the VPU 120.

The DSL transceivers 110$i$ respectively comprise:

a Digital Signal Processor (DSP) 111$i$; and an Analog Front End (AFE) 112$i$.

The CPE 200$i$ comprises respective DSL transceivers 210$i$.

The DSL transceivers 210$i$ respectively comprise:

a Digital Signal Processor (DSP) 211$i$; and an Analog Front End (AFE) 212$i$.

The AFEs 112$i$ and 212$i$ respectively comprise a Digital-to-Analog Converter (DAC) and an Analog-to-Digital Converter (ADC), a transmit filter and a receive filter for confining the signal energy within the appropriate communication frequency bands while rejecting out-of-band interference, a line driver for amplifying the transmit signal and for driving the transmission line, and a Low Noise Amplifier (LNA) for amplifying the receive signal with as little noise as possible.

The AFEs 112$i$ and 212$i$ further comprise a hybrid for coupling the transmitter output to the transmission line and the transmission line to the receiver input while achieving low transmitter-receiver coupling ratio, impedance-matching circuitry for adapting to the characteristic impedance of the transmission line, and isolation circuitry (typically a transformer).

The DSPs 111i and 211i are respectively configured to operate downstream and upstream DSL communication channels.

The DSPs 111i and 211i are further configured to operate downstream and upstream DSL control channels that are used to transport DSL control traffic, such as diagnosis or management commands and responses. Control traffic is multiplexed with user traffic over the DSL channel.

More specifically, the DSPs 111i and 211i are for encoding and modulating user and control data into digital data symbols, and for de-modulating and decoding user and control data from digital data symbols.

The following transmit steps are typically performed within the DSPs 111i and 211i:
data encoding, such as data multiplexing, framing, scrambling, error correction encoding and interleaving;
signal modulation, comprising the steps of ordering the carriers according to a carrier ordering table, parsing the encoded bit stream according to the bit loadings of the ordered carriers, and mapping each chunk of bits onto an appropriate transmit constellation point (with respective carrier amplitude and phase), possibly with Trellis coding;
signal scaling;
Inverse Fast Fourier Transform (IFFT);
Cyclic Prefix (CP) insertion; and possibly
time-windowing.

The following receive steps are typically performed within the DSPs 111i and 211i:
CP removal, and possibly time-windowing;
Fast Fourier Transform (FFT);
Frequency EQualization (FEQ);
signal de-modulation and detection, comprising the steps of applying to each and every equalized frequency sample an appropriate constellation grid, the pattern of which depends on the respective carrier bit loading, detecting the expected transmit constellation point and the corresponding transmit bit sequence, possibly with Trellis decoding, and re-ordering all the detected chunks of bits according to the carrier ordering table; and
data decoding, such as data de-interleaving, error correction, de-scrambling, frame delineation and de-multiplexing.

The DSPs 111i are further configured to supply transmit frequency samples $u_i$ to the VPU 120 before Inverse Fast Fourier Transform (IFFT) step for joint signal precoding.

The DSPs 111i are further configured to receive corrected frequency samples $x_i$ from the VPU 120 for further transmission. Alternatively, the DSPs 111i may receive correction samples to add to the initial frequency samples.

The VPU 120 comprises a modulo unit 121 serially coupled to a linear precoder 122. The initial transmit vector U is input to the modulo unit 120, while the pre-compensated transmit vector X is output to the DSP 111i for further transmission over the respective transmission lines Li.

The modulo unit 121 is configured to determine an amount of modulo shift $\delta_i$ to apply to the respective transmit samples $u_i$ based on a first channel coupling matrix L. The so-determined individual modulo shifts $\delta_i$ yields a modulo shift vector $\Delta$ which is added to the transmit vector U. The modulo unit 120 operates with $b_L$ bits arithmetic.

The linear precoder 122 is configured to mitigate the crosstalk induced over the transmission lines L1 to LN. More specifically, the linear precoder 122 multiplies the input vector U+$\Delta$ with a precoding matrix P'=(I+G)$^{-1}$S=QL so as to diagonalize the overall channel matrix HP'=DS. The linear precoder 122 operates with b bits arithmetic with b>$b_L$, meaning the modulo unit 121 operates on lower precision arithmetic compared to the linear precoder 122.

Figure 5:
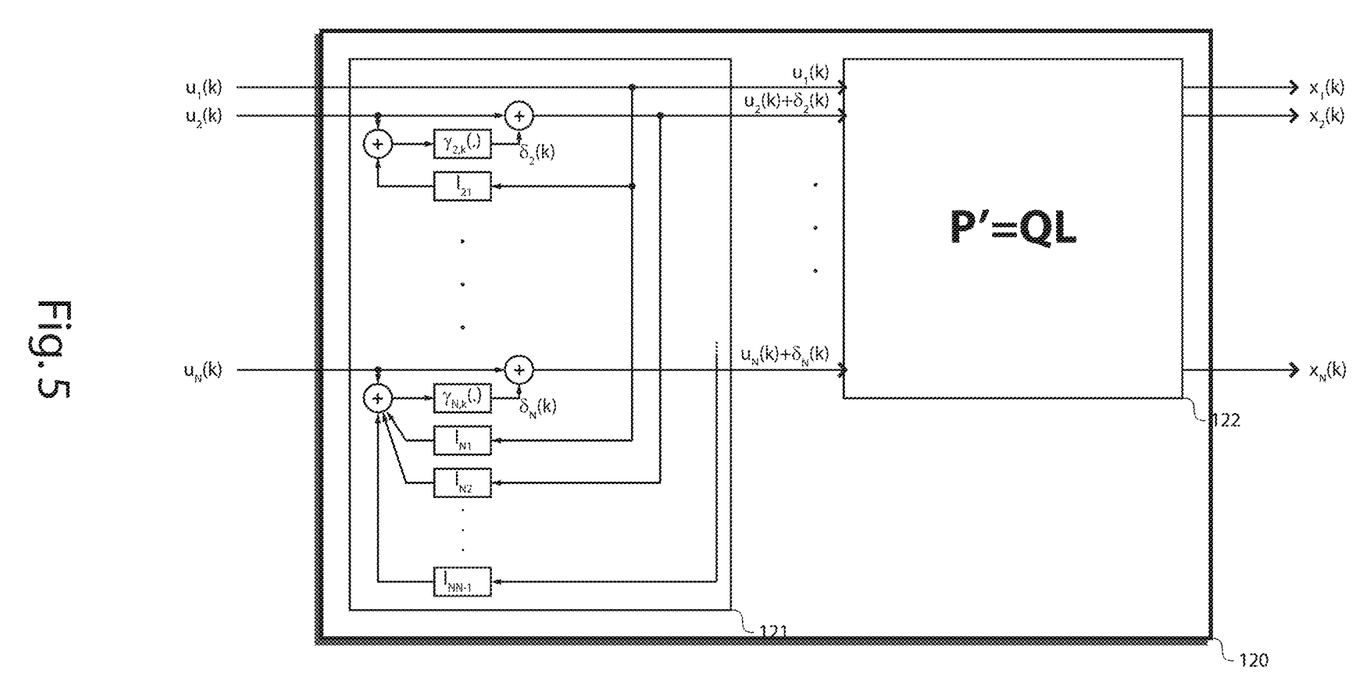
FIG. 5 represents further details about a non-linear precoder as per the present invention.

There is seen in FIG. 5 further details about the VPU 120.

The transmit vector U is input to the modulo unit 121 for determination of the modulo shift vector $\Delta$. The component $\delta_i$ of the modulo shift vector $\Delta$ are given by:

$$\delta_i = \gamma_{i,k}\left(u_i + \sum_{j=1}^{i-1} l_{ij} \cdot (u_j + \delta_j)\right), \quad (11)$$

wherein the modulo shift operator $Y_{i,k}(\cdot)$ is defined by:

$$\gamma_{i,k}(x_{i,k}) = -d \cdot M_{i,k} \cdot \left\lfloor \frac{x_{i,k} + d \cdot M_{i,k}/2}{d \cdot M_{i,k}} \right\rfloor = \Gamma_{i,k}(x_{i,k}) - x_{i,k}. \quad (12)$$

The modulo shift vector $\Delta$ is then added to the transmit vector U to yield U+$\Delta$ at the output of the modulo unit 121.

Equation (11) is to be computed row per row as the outputs $u_j+\delta_j$ of the previous rows j<i is required for the computation of the current modulo shift $\delta_i$. It is also to be noticed that $\delta_1=0$, and that $u_1$ is transparently passed to the output of the modulo unit 121.

Next, the linear precoder 121 takes the input vector U+$\Delta$, and multiplies it with P'=(I+G)$^{-1}$S=QL through a single matrix multiplication stage to yield the pre-compensated transmit vector X=QL(U+$\Delta$). The individual components of the vector X are returned to the respective DSPs 111 for further transmission over the respective transmission lines.

The VCU 130 is basically for supplying the channel coupling matrices L and P' to the modulo unit 121 and to the linear precoder 122 respectively. Those matrices are computed from the crosstalk estimates between the transmission lines L1 to LN.

The VCU 130 starts first by configuring the respective downstream pilot sequences to be used over the respective transmission lines L1 to LN. The pilot digit transmitted over the transmission line Li at frequency index k during a given symbol period m is denoted as $W_i^m(k)$. The pilot sequences are mutually orthogonal, and comprises M pilot digits $\{W_i^m(k)\}_{1 \ldots M}$ to be transmitted over M symbol periods with M N (in order to satisfy the orthogonality requirement). The pilot sequences are typically transmitted during specific symbol periods, such as the so-called SYNC symbols, and/or over specific carriers, such as the so-called PROBE carriers (which shall span a significant portion of the transmit spectrum to be sufficiently representative).

The VCU 130 gathers respective slicer errors as measured during the detection of the pilot digits by the remote transceivers 210i. The slicer error as measured by the transceiver 210i over a victim line Li at frequency index k during symbol period m is denoted as $E_i^m(k)$.

The transceivers 210i are further configured to report the measured slicer error value $E^m_i(k)$ to the VCU 130 (see Err-R message in FIG. 4).

So as to reduce the amount of error feedback information, interference measurements are typically available at a decimated set of frequency indexes.

Next, the VCU 130 correlates the M error measurements $\{E_i^m(k)\}_{1 \ldots M}$ as measured over the victim line Li over a complete acquisition cycle with the M respective pilot digits $\{W^m(k)\}_{1 \ldots M}$ of the pilot sequence transmitted over a disturber line Lj so as to obtain an estimate of the equalized crosstalk coefficients $h_{ij}(k)/h_{ii}(k)$ from the disturber line Lj into the victim line Li at frequency index k. As the pilot sequences are mutually orthogonal, the contributions from the other disturber lines reduce to zero after this correlation step.

Some extra interpolation step is typically required to find out the equalized crosstalk coefficients at all applicable frequency indexes.

The VCU 130 can now proceed with the computation of the ZF precoding matrix $(I+G)^{-1}$, and further with its QR matrix decomposition as per equations (4) to (6) to yield the unitary matrix Q, the lower triangular matrix with unit diagonal L, and the scaling diagonal matrix S. The coupling matrix to be pushed in the linear precoder 122 is equal to $P'=(I+G)^{-1}S=QL$, and the coupling matrix to be pushed in the modulo unit 121 is equal to L; the components $r_{ii}^{-1}$ of the scaling matrix $S^{-1}$ shall be returned to the respective DSP 110i for further communication to the CPEs 200i.

Typically, the VCU 130 uses a first-order or second-order matrix inversion to compute the initial coefficients of the matrix $(I+G)^{-1}$.

During channel tracking mode, the VCU 130 does not need to update P' and L simultaneously. Indeed, the precoding matrix P' needs to accurately track any variation of the channel matrix H so as to remove any residual crosstalk, e.g. by means of a Least Mean Square (LMS) iterative algorithm which adjusts the coefficients of the precoding matrix P' to their optimal value based on the observed residual crosstalk. On the contrary, the matrix L can be updated on a coarser pattern as any error in L would only result in a temporary violation of the transmit PSD mask.

If discontinuous transmission mode is used, then active and discontinued lines need to be regrouped into contiguous subsets. Take a permutation matrix π such that the last elements in $U^{(p)}=\pi U$ are the discontinued lines.

With the prior art non-linear precoder as per FIG. 1, we get $\pi X = \pi Q L U = \pi Q L \pi^* \pi U$, or:

$$X^{(p)} = \pi Q L \pi^* U^{(p)} \quad (13).$$

π permutes the matrices $Q^{(p)}=\pi Q$ and $L^{(p)}=L\pi^*$ such that equation (13) can be written as:

$$\begin{bmatrix} X_A^{(p)} \\ X_D^{(p)} \end{bmatrix} = \begin{bmatrix} Q_{AA}^{(p)} & Q_{AD}^{(p)} \\ Q_{DA}^{(p)} & Q_{DD}^{(p)} \end{bmatrix} \begin{bmatrix} L_{AA}^{(p)} & L_{AD}^{(p)} \\ L_{DA}^{(p)} & L_{DD}^{(p)} \end{bmatrix} \begin{bmatrix} U_A^{(p)} \\ V_D^{(p)} \end{bmatrix}, \quad (14)$$

wherein A and D subscripts denote the active and discontinued subsets respectively. Note that the above permutations do not involve any matrix multiplication.

Due to the permutation, $L^{(p)}$ is no longer lower triangular, yet the permutation matrix π can be chosen such that $L_{AA}^{(p)}$ and $L_{DD}^{(p)}$ are lower triangular, i.e. the encoding order is preserved within each subset A or D.

With discontinuous transmission, $V_D^{(p)}$ is chosen such that $X_D^{(p)}=0$ or alternatively:

$$V_D^{(p)} = -(Q_{DA}^{(p)} L_{AD}^{(p)} + Q_{DD}^{(p)} L_{DD}^{(p)})^{-1} (Q_{DA}^{(p)} L_{AA}^{(p)} + Q_{DD}^{(p)} L_{DA}^{(p)}) U_A^{(p)} \quad (15)$$

With $P^{(p)}=\pi P\pi^*$, equation (15) can be rewritten as:

$$V_D^{(p)} = -P_{DD}^{(p)-1} P_{DA}^{(p)} U_A^{(p)} \quad (16).$$

This leads to a 'chicken-egg' problem, since $U_A^{(p)}$ is needed to obtain $V_D^{(p)}$, and $V_D^{(p)}$ is needed to apply modulo operation to obtain $U_A^{(p)}$. We now make the observation that $V_D^{(p)}$ consists of precompensation signals only, and is expected to not contribute excessively to the transmit PSD on the active lines of the subset A. One can therefore get the required modulo operation on the active lines of the subset A by applying non-linear precoding to $U_A^{(p)}$ through $L_{AA}^{(p)}$. Denote the equivalent precoder input as $U_A^{(p)}+\Delta A$. We now compute $V_D^{(p)}=-P_{DD}^{(p)-1} P_{DA}^{(p)} (U_A^{(p)}+\Delta_A)$, and get the precompensated transmit vector X as:

$$\begin{bmatrix} X_A^{(p)} \\ 0 \end{bmatrix} = \begin{bmatrix} Q_{AA}^{(p)} & Q_{AD}^{(p)} \\ Q_{DA}^{(p)} & Q_{DD}^{(p)} \end{bmatrix} \begin{bmatrix} L_{AA}^{(p)} & L_{AD}^{(p)} \\ L_{DA}^{(p)} & L_{DD}^{(p)} \end{bmatrix} \begin{bmatrix} U_A^{(p)}+\Delta_A \\ V_D^{(p)} \end{bmatrix}, \quad (17)$$

or $$X_A^{(p)} = (Q_{AA}^{(p)} L_{AA}^{(p)} + Q_{AD}^{(p)} L_{DA}^{(p)})(U_A^{(p)}+\Delta_A) + (Q_{AA}^{(p)} L_{AD}^{(p)} + Q_{AD}^{(p)} L_{DD}^{(p)}) V_D^{(p)},$$

of which $L_{AA}^{(p)}(U_A^{(p)}+\Delta_A)$ and $L_{DA}^{(p)}(U_A^{(p)}+\Delta_A)$ have already been computed.

The total complexity of this approach is larger than that of non-linear precoding with all lines active because 6 of the 8 sub-blocks need to be multiplied with two different vectors.

With the proposed non-linear precoding implementation, discontinuous mode operates as follows.

The lines are first permuted as aforementioned so as the active and discontinuous lines form contiguous subsets. Next, the active subset $U_A^{(p)}$ of transmit samples is passed through the non-linear precoder $L_{AA}^{(p)}$, and the corresponding shift vector $\Delta_A$ is stored. The virtual signal $V_D^{(p)}$ is then computed as $V_D^{(p)}=-P'_{DD}{}^{(p)-1}P'_{DA}{}^{(p)}(U_A^{(p)}+\Delta_A)$, wherein $P'^{(p)}=\pi P'\pi^*=\pi PS\pi^*$ (i.e., the precoding matrix includes the scaling matrix S). One may use a first order approximation to determine $P'_{DD}{}^{(p)-1}$. Finally, $X_A^{(p)}$ is computed as:

$$X_A^{(p)} = P_{AA}^{(p)}(U_A^{(p)}+\Delta_A) + P_{AD}^{(p)} V_D^{(p)} = P_{AA}^{(p)}(U_A^{(p)}+\Delta_A) - P_{AD}^{(p)} P'_{DD}{}^{(p)-1} P'_{DA}{}^{(p)}(U_A^{(p)}+\Delta_A) \quad (18).$$

In this case, the number of sub-matrix multiplications does not increase due to discontinuous mode. No additional processing resources must be foreseen for enabling discontinuous mode.

Because the shift vector $\Delta_A$ is computed without taking into account the virtual signal $V_D^{(p)}$ on the discontinued lines, there may be an energy increase due to the factor $P'_{AD}{}^{(p)} V_D^{(p)} = -P'_{AD}{}^{(p)} P'_{DD}{}^{(p)-1} P'_{DA}{}^{(p)}(U_A^{(p)}+\Delta_A)$.

However it is to be noted that, when some lines are discontinued, transmit power increase on other lines may be allowed as long as the aggregate power over the entire bundle remains similar.

The lower precision arithmetic for the modulo unit 121 can also be exploited for facilitating the discontinuous mode. Here, benefit is taken from the fact that the multiplication with L is not in the data path but only serves to determine the shift vector Δ, and that Δ lies on a coarse grid. Discontinuous transmission mode would then operate as follows.

Perform first QL matrix decomposition at lower precision on the matrix $P'_{AA}{}^{(p)} - P'_{AD}{}^{(p)} P'_{DD}{}^{(p)-1} P'_{DA}{}^{(p)}$, potentially through approximation of $P'_{DD}{}^{(p)-1}$. At full precision, the matrix inversion would cost $b^2 N_D^3$ multiply-accumulate operations, wherein $N_D$ denotes the number of discontinued lines. At lower precision, the matrix inversion only costs $b_L^2 N_D^3$ multiply-accumulate operations. Next, the active subset $U_A^{(p)}$ of transmit samples is passed through the non-linear precoder $L_{AA}^{(p)}$ at lower precision too, and the corresponding shift vector $\Delta_A$ is stored. The virtual signal $V_D^{(p)}$ is then computed as $V_D^{(p)} = -P'_{DA}{}^{(p)-1} P_{DA}^{(p)}(U_A^{(p)}+\Delta_A)$ at full precision. Finally, $X_A^{(p)}$ is computed as $X_A^{(p)} = P_{AA}^{(p)}(U_A^{(p)}+\Delta_A) + P_{AD}^{(p)} V_D^{(p)}$ also at full precision.

Note that during discontinuous transmission mode, the precoding matrix P' does not need to be updated. The above permutation π is actually only a matter of multiplying the components of the input vector $U_A+\Delta_A$ with coefficients of the existing matrix P' selected in a specific order. Only the matrix L needs to be updated. The encoding order for the new matrix L can be the same as for the previous matrix L omitting the discontinued lines.

Also, the computational complexity of getting $-P'_{AD}{}^{(p)} P'_{DD}{}^{(p)-1} P'_{DA}{}^{(p)}$ depends on $N_D$. Hence, it may be beneficial to use different $b_L$ for different $N_D$ to get a timely update of the channel coupling matrix L.

It is to be noticed that the term 'comprising' should not be interpreted as being restricted to the means listed thereafter. Thus, the scope of the expression 'a device comprising means A and B' should not be limited to devices consisting only of components A and B. It means that with respect to the present invention, the relevant components of the device are A and B.

It is to be further noticed that the term 'coupled' should not be interpreted as being restricted to direct connections only. Thus, the scope of the expression 'a device A coupled to a device B' should not be limited to devices or systems wherein an output of device A is directly connected to an input of device B, and/or vice-versa. It means that there exists a path between an output of A and an input of B, and/or vice-versa, which may be a path including other devices or means.

The description and drawings merely illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, a processor should not be construed to refer exclusively to hardware capable of executing software, and may implicitly include, without limitation, digital signal processor (DSP) hardware, network processor, application specific integrated circuit (ASIC), field programmable gate array (FPGA), etc. Other hardware, conventional and/or custom, such as read only memory (ROM), random access memory (RAM), and non volatile storage, may also be included.

What is claimed is:

1. An access node comprising:
    a signal processor for pre-processing signals for crosstalk mitigation; and
    a controller for controlling the operation of the signal processor, wherein the signal processor comprises
    a modulo unit configured to determine individual modulo shifts for respective transmit samples to be transmitted over respective communication channels based on first channel coupling information, and to add the modulo shifts to the respective unprecoded transmit samples, and
    a linear precoder configured to jointly process the resulting transmit samples based on second channel coupling information, and wherein the controller is configured to update the first channel coupling information and the second channel coupling information independently from each other, wherein the second channel coupling information are updated for diagonalization of an overall channel matrix resulting from the concatenation of the linear precoder with the communication channels.

2. The access node according to claim 1, wherein the modulo unit is further configured to use lower precision arithmetic than the linear precoder.

3. The access node according to claim 2, wherein the precision arithmetic for the modulo unit is a function of the number of active communication channels among the communication channels.

4. The access node according to claim 1, wherein the controller is further configured to update the first channel coupling information upon a change of the set of active communication channels while leaving the second channel coupling information unchanged.

5. The access node according to claim 1, wherein the signal processor is configured to jointly process the resulting transmit samples through the linear precoder by means of a single matrix multiplication stage.

6. The access node according to claim 1, wherein the access node is a Digital subscriber Line Access Multiplexer DSLAM.

7. A method for pre-processing signals for crosstalk mitigation, wherein the method comprises:
    determining individual modulo shifts for respective transmit samples to be transmitted over respective communication channels based on first channel coupling information;
    adding the modulo shifts to the respective unprecoded transmit samples; and
    jointly processing the resulting transmit samples through linear precoding based on second channel coupling information, and wherein the method further comprises updating the first channel coupling information and the second channel coupling information independently from each other, wherein
    the second channel coupling information are updated for diagonalization of an overall channel matrix resulting from the concatenation of the linear precoder with the communication channels.

8. The method according to claim 7, wherein the method further comprises using lower precision arithmetic for modulo operation than for linear precoding.

9. The method according to claim 8, wherein the precision arithmetic for modulo operation is a function of the number of active communication channels among the communication channels.

10. The method according to claim 7, wherein the method further comprises updating the first channel coupling information upon a change of active communication channels among the communication channels, while leaving the second channel coupling information unchanged.

11. The method according to claim 7, wherein the resulting transmit samples are jointly processed through the linear precoder by means of a single matrix multiplication stage.

12. An access node comprising:
    a signal processor for pre-processing signals for crosstalk mitigation; and
    a controller for controlling the operation of the signal processor, wherein the signal processor includes;

a modulo unit configured to determine individual modulo shifts for respective transmit samples to be transmitted over respective communication channels based on first channel coupling information, and to add the modulo shifts to the respective unprecoded transmit samples, and a linear precoder configured to jointly process the resulting transmit through a single matrix multiplication stage samples based on second channel coupling information, the second channel coupling information being a single precoder matrix, and wherein the controller is configured to update the first channel coupling information and the second channel coupling information independently from each other, and wherein the controller is configured to update the second channel coupling information by a Least Means Square algorithm.

13. A signal processing unit for pre-processing signals for crosstalk mitigation, comprising:

a modulo unit configured to determine individual modulo shifts for respective transmit samples to be transmitted over respective communication channels based on first channel coupling information, and configured to add the modulo shifts to the respective unprecoded transmit samples; and a linear precoder configured to jointly process the resulting transmit samples, wherein the modulo unit is configured to use a first number of bits of precision arithmetic, and the linear precoder is configured to use a second number of bits of precision of arithmetic, and the first number of bits of precision arithmetic is less than the second number of bits of precision arithmetic.

* * * * *